(12) United States Patent
Niinuma et al.

(10) Patent No.: US 10,296,360 B2
(45) Date of Patent: May 21, 2019

(54) DISPLAY CONTROL DEVICE AND METHOD

(71) Applicant: FUJITSU LIMITED, Kawasaki-shi, Kanagawa (JP)

(72) Inventors: Koichiro Niinuma, Kawasaki (JP); Teruyuki Sato, Tama (JP); Arata Shimizu, Kawasaki (JP); Masahiro Hirata, Higasikurume (JP); Masao Hirocho, Kawasaki (JP); Kazutoshi Sakaguchi, Ota (JP)

(73) Assignee: FUJITSU LIMITED, Kawasaki (JP)

( * ) Notice: Subject to any disclaimer, the term of this patent is extended or adjusted under 35 U.S.C. 154(b) by 71 days.

(21) Appl. No.: 15/713,815

(22) Filed: Sep. 25, 2017

(65) Prior Publication Data

US 2018/0107494 A1    Apr. 19, 2018

(30) Foreign Application Priority Data

Oct. 19, 2016    (JP) .................. 2016-205497

(51) Int. Cl.

| G06Q 30/02 | (2012.01) |
| G06F 9/451 | (2018.01) |
| G06F 16/951 | (2019.01) |
| G06F 3/0484 | (2013.01) |
| G06F 3/0485 | (2013.01) |

(Continued)

(52) U.S. Cl.

CPC ............ *G06F 9/453* (2018.02); *G06Q 30/02* (2013.01); *G06F 3/0485* (2013.01); *G06F 3/04842* (2013.01); *G06F 3/04883* (2013.01); *G06F 16/951* (2019.01); *G06T 11/206* (2013.01); *G06T 11/60* (2013.01); *G06T 2200/24* (2013.01)

(58) Field of Classification Search

CPC ..................................... G06Q 30/02
USPC ................................................. 715/708
See application file for complete search history.

(56) References Cited

U.S. PATENT DOCUMENTS

| 5,583,331 A * | 12/1996 | Dvorkis ............. G06K 7/10564 235/462.06 |
| 6,731,393 B1 * | 5/2004 | Currans ............. G06Q 10/0631 358/1.12 |

(Continued)

FOREIGN PATENT DOCUMENTS

| JP | 2014-191539 | 10/2014 |
| JP | 5973094 | 8/2016 |

OTHER PUBLICATIONS

Fox, Steve et al., "Evaluating Implicit Measures to Improve Web Search", ACM Transactions on Information Systems, vol. 23, No. 2, Apr. 1, 2005, pp. 147-168, XP058120265.

(Continued)

*Primary Examiner* — Reza Nabi
(74) *Attorney, Agent, or Firm* — Fujitsu Patent Center

(57) ABSTRACT

A display control method includes: based on information acquired from an information processing terminal that accesses content provided by an information processing device, computing a degree of interest and a degree of perplexity, with respect to the content, of a user using the information processing terminal; and, based on the computed degree of interest and the computed degree of perplexity, displaying a symbol corresponding to the information processing terminal at a corresponding position in a region that has degree of interest and degree of perplexity as axes.

20 Claims, 12 Drawing Sheets

(51) Int. Cl.
*G06F 3/0488* (2013.01)
*G06T 11/20* (2006.01)
*G06T 11/60* (2006.01)

(56) References Cited

U.S. PATENT DOCUMENTS

| | | | | |
|---|---|---|---|---|
| 7,025,346 | B1* | 4/2006 | Currans | H04N 1/00567 |
| | | | | 271/147 |
| 8,423,369 | B2* | 4/2013 | Sato | G10L 25/78 |
| | | | | 704/257 |
| 9,411,422 | B1* | 8/2016 | McClendon | G06F 3/016 |
| 9,479,696 | B1* | 10/2016 | Miller | G06Q 50/01 |
| 2007/0128899 | A1* | 6/2007 | Mayer | G06F 9/4406 |
| | | | | 439/152 |
| 2008/0109684 | A1* | 5/2008 | Addleman | G06F 11/3419 |
| | | | | 714/47.2 |
| 2008/0126413 | A1* | 5/2008 | Addleman | G06F 11/0709 |
| 2008/0177994 | A1* | 7/2008 | Mayer | G06F 9/4418 |
| | | | | 713/2 |
| 2009/0076995 | A1* | 3/2009 | Uyama | G06Q 30/02 |
| | | | | 706/46 |
| 2009/0199103 | A1* | 8/2009 | Brantley | G06F 16/958 |
| | | | | 715/733 |
| 2014/0223462 | A1* | 8/2014 | Aimone | A61B 5/0476 |
| | | | | 725/10 |
| 2015/0077428 | A1* | 3/2015 | Stevens | G06T 11/206 |
| | | | | 345/589 |
| 2015/0163258 | A1* | 6/2015 | Garcia, III | H04L 67/24 |
| | | | | 709/204 |
| 2015/0350294 | A1* | 12/2015 | Takami | G06Q 30/02 |
| | | | | 715/760 |
| 2016/0034511 | A1* | 2/2016 | Giginiak | G06F 16/2272 |
| | | | | 707/767 |
| 2016/0173540 | A1* | 6/2016 | Linden | H04L 65/1083 |
| | | | | 705/26.8 |
| 2017/0177589 | A1* | 6/2017 | Shorman | G06F 16/48 |
| 2017/0213127 | A1* | 7/2017 | Duncan | G06F 19/24 |
| 2017/0295114 | A1* | 10/2017 | Goldberg | H04L 51/02 |
| 2018/0107494 | A1* | 4/2018 | Niinuma | G06F 9/453 |
| 2018/0182014 | A1* | 6/2018 | Cheng | G06Q 30/0631 |
| 2018/0314925 | A1* | 11/2018 | Gauci | G06N 3/0445 |

OTHER PUBLICATIONS

Extended European Search Report dated Nov. 29, 2017 for corresponding European Patent Application No. 17193706.3.

* cited by examiner

FIG.2

| USER ID | TIME | ACCESSED PAGE |
|---|---|---|
| 001 | t1 | http://www.xxx.co.jp/ |
| 001 | t2 | http://www.xxx.co.jp/menu/ |
| 001 | t3 | http://www.xxx.co.jp/item1/ |
| 001 | t4 | http://www.xxx.co.jp/item2/ |
| ... | | |

FIG.3

| USER ID | TYPE | OPERATION POSITION | SCROLL DIRECTION | SCROLL AMOUNT | TIME |
|---|---|---|---|---|---|
| 001 | TOUCH | (x1, y1) | — | — | t1 |
| ... | | | | | |
| 002 | FLICK | — | UP | P1 | t1 |
| 002 | FLICK | — | UP | P1 | t2 |
| ... | | | | | |

| TIME | USER ID | DEGREE OF INTEREST | DEGREE OF PERPLEXITY | ASSISTANCE |
|---|---|---|---|---|
| T1 | 001 | I11 | S11 | — |
| T1 | 002 | I21 | S21 | TEXT CHAT |
| T1 | 003 | I31 | S31 | TEXT CHAT |
| ... | | | | |
| T2 | 002 | I22 | S22 | TEXT CHAT |
| T2 | 003 | I32 | S32 | OPERATOR |
| ... | | | | |

DISPLAY CONTROL DEVICE AND METHOD

CROSS-REFERENCE TO RELATED APPLICATION

This application is based upon and claims the benefit of priority of the prior Japanese Patent Application No. 2016-205497, filed on Oct. 19, 2016, the entire contents of which are incorporated herein by reference.

FIELD

The embodiments discussed herein are related to a storage medium storing a display control program, a display control device, and a display control method.

BACKGROUND

Hitherto, a system has been proposed for ascertaining a state of a customer in advance and making contact in accordance with the customer state. In this system, the state of mind of the customer is estimated, from plural predetermined states of mind, based on customer behavior information obtained from customer behavior. Further, for each of plural states of mind, the system stores approach information that includes information indicating how to make contact with a customer. Then, the system detects a customer having an estimated state of mind that differs from a previous state of mind, reads approach information corresponding to the detected state of mind of the customer, and presents the read approach information.

Further, a system has been proposed for providing support for service-related inquiries from customers. The system presents FAQ content, related to services provided to customers, on a customer terminal operated by the customer and gathers FAQ browsing history information related to the history of browsing of the FAQ content by customers. The system then stores the FAQ browsing history information in association with the customer, and the system displays the FAQ browsing history information associated with the customer at an operator terminal operated by an operator when there has been a service-related inquiry from the customer.

RELATED PATENT DOCUMENTS

Japanese Laid-Open Patent Publication No. 2014-191539
Japanese Patent No. 5973094

SUMMARY

According to an aspect of the embodiments, a non-transitory recording medium stores a display control program that causes a computer to execute a process. The process includes, based on information acquired from an information processing terminal that accesses content provided by an information processing device, computing a degree of interest and a degree of perplexity, with respect to the content, of a user using the information processing terminal. The process further includes, based on the computed degree of interest and the computed degree of perplexity, displaying a symbol corresponding to the information processing terminal at a corresponding position in a region that has degree of interest and degree of perplexity as axes.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram illustrating an example of an access log database;
FIG. 3 is a diagram illustrating an example of an operation information database.

DESCRIPTION OF EMBODIMENTS

An exemplary embodiment according to technology disclosed herein is described in detail below, with reference to the drawings.

Figure 1:
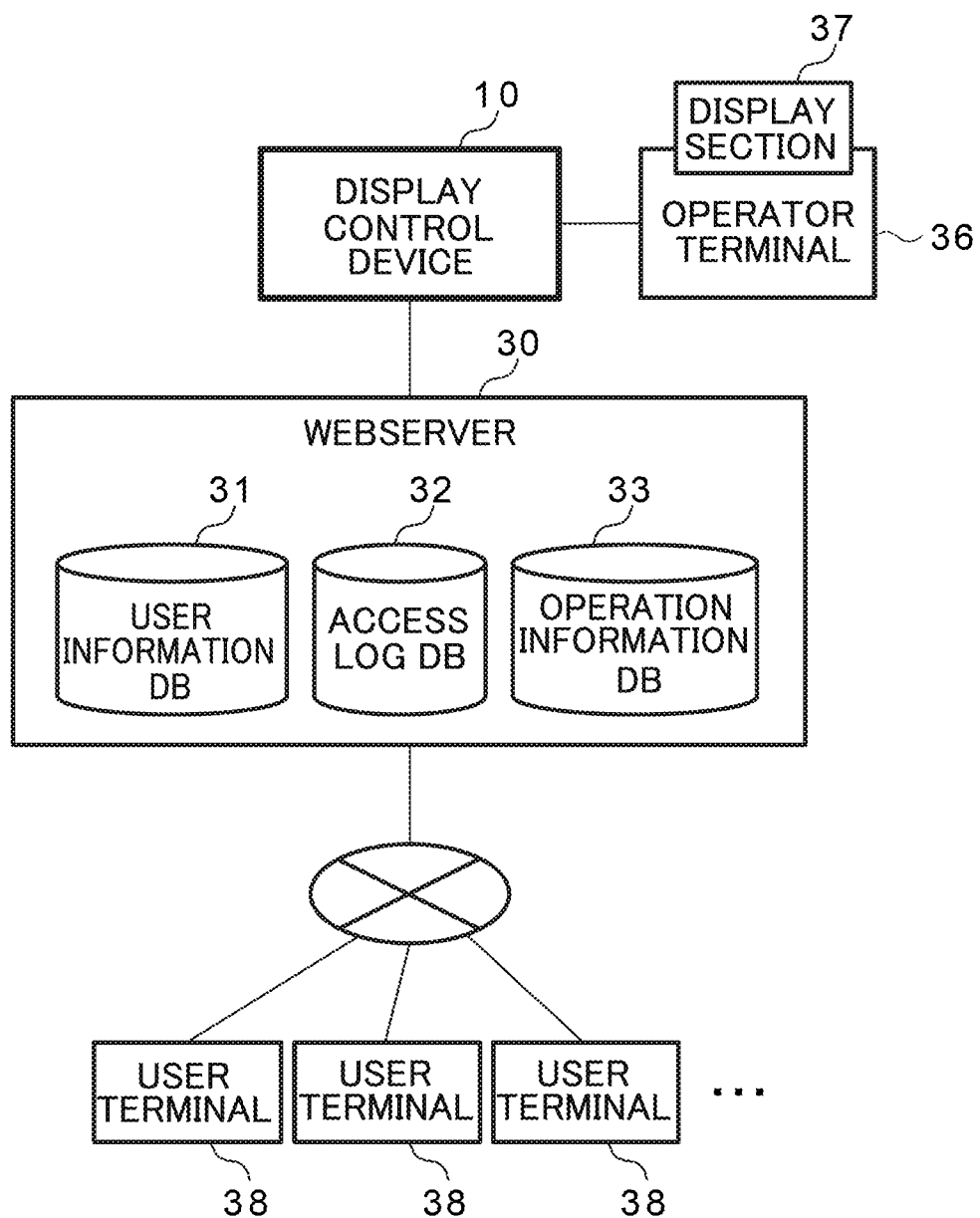
FIG. 1 is a block diagram illustrating a schematic configuration of an exemplary embodiment.

As illustrated in FIG. 1, a display control device 10 according to the present exemplary embodiment is connected to a webserver 30 and an operator terminal 36.

The webserver 30 may be implemented by an information processing device such as a server device or a personal computer, and the webserver 30 provides website information including text and images to web browsers running on user terminals 38. Web sites are thereby displayed on the user terminals 38 using the web browsers. Note that the webserver 30 is an example of an information processing device of technology disclosed herein and a website is an example of content of technology disclosed herein.

Further, a user information database (DB) 31, an access log DB 32, and an operation information DB 33 are stored in a predetermined storage region of the webserver 30.

User information regarding users who use a website provided by the webserver 30 is stored in a user information DB 31. The user information includes a user ID that is user identifying information, attribute information such as the name, age, and sex of the user, contact information such as a telephone number or a mail address, image information used as a profile photograph of the user, and the like.

From when each user logs in to the website until the user logs out, information indicating which pages within the website were accessed is stored in the access log DB 32 in association with information regarding the time of access. FIG. 2 illustrates an example of the access log DB 32. In the example of FIG. 2, "user ID", "time" indicating time of access, and "URL" indicating the accessed page are stored in association with one another. The URL includes a page request transmitted from the user terminal 38 to the webserver when an element such as a link was selected to transition to another page within the website.

The operation information DB 33 stores operation information such as a type of operation performed when a user is browsing the website, an operation position, a scroll direction, a scroll amount, and a time of operation. The type of operation is, for example, a keypress, a click, or the like when input operations are made using a mouse and keyboard, or is a tap, a flick, a swipe, a pinch, or the like when input operations are made using a touch panel. Operation position refers to coordinates on a display region of a web browser corresponding to a position where a touch or click was performed. Scroll direction refers to information indicating which direction a screen was scrolled when an operation to scroll the screen was performed, and is, for example, an up direction, a down direction, a right direction, a left direction, or the like of the screen. Scroll amount refers to information indicating how many pixels the screen was scrolled in the scroll direction when an operation to scroll the screen was performed.

FIG. 3 illustrates an example of the operation information DB 33. Note that there is no need to acquire all items of information for all operations. For example, information regarding scroll direction and scroll amount is unnecessary for operations that do not entail scrolling of the screen, and information regarding operation position is unnecessary for operations that entail scrolling of the screen. Further, information other than the information illustrated in FIG. 3 may be acquired as the operation information.

The operator terminal 36 may be implemented by an information processing device such as a personal computer, a tablet terminal, or a smartphone. The operator terminal 36 includes a display section 37 implemented by a liquid crystal display or the like, and the display section 37 is controlled by the display control device 10 and displays various screens.

The user terminals 38 may be implemented by information processing devices such as personal computers, tablet terminals, and smartphones. Note that the number of user terminals 38 is not limited to that in the example of FIG. 1. Note that the user terminals 38 are examples of an information processing terminal of technology disclosed herein.

Figures 4, 5:
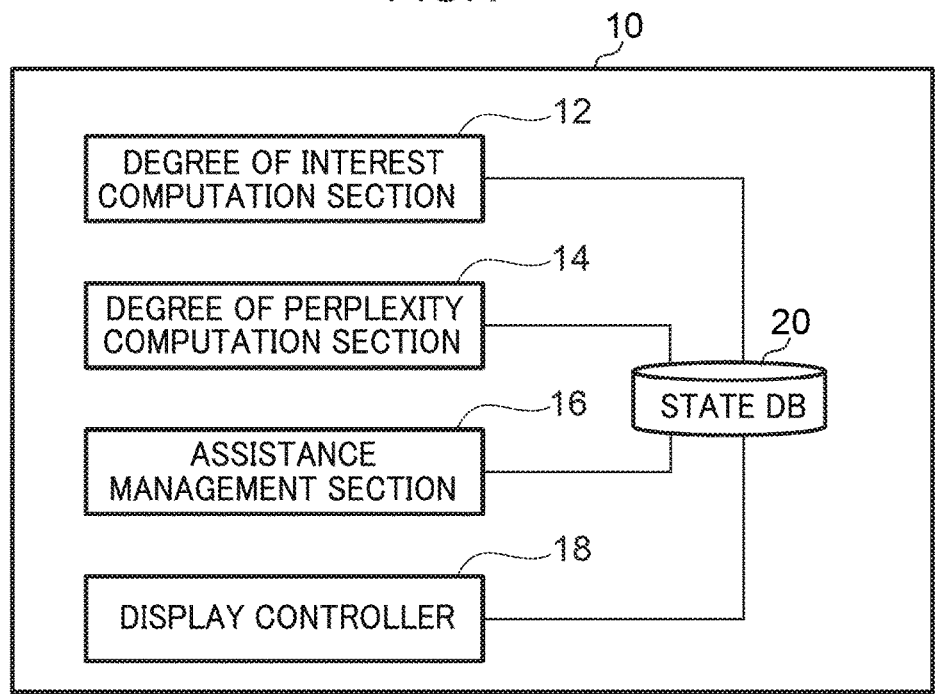
FIG. 4 is a functional block diagram of a display control device according to an exemplary embodiment.
FIG. 5 is a diagram illustrating an example of a state database.

As illustrated in FIG. 4, the display control device 10 functionally includes a degree of interest computation section 12, a degree of perplexity computation section 14, an assistance management section 16, and a display controller 18. Further, a state DB 20 is stored in a predetermined storage region of the display control device 10. Note that the degree of interest computation section 12 and the degree of perplexity computation section 14 are examples of computation sections of technology disclosed herein.

The degree of interest computation section 12 computes the degree of interest of each user toward the website at respective predetermined times based on the information stored in the access log DB 32 and the operation information DB 33 of the webserver 30.

For example, the degree of interest computation section 12 may compute a higher degree of interest the longer a dwell time spent on the web site. More specifically, the degree of interest computation section 12 may reference the access log DB 32 to acquire the time elapsed since logging in for each user as the dwell time spent on the website, and may compute a value of the acquired dwell time multiplied by a predetermined coefficient as the degree of interest.

Further, the degree of interest computation section 12 may, for example, compute a lower degree of interest the faster the scroll speed on a page when the user is browsing the website. More specifically, for each user, the degree of interest computation section 12 extracts from the operation information DB 33 aggregate operation information for successive operations of a type that entails scrolling of the screen, and calculates the total scroll amount (pixels) indicated and a total operation time (s) based on the extracted operation information. The degree of interest computation section 12 can then calculate the scroll speed (pixels/s) as the total scroll amount (pixels)/the total operation time (s), and may compute a value of the reciprocal of the scroll speed multiplied by a predetermined coefficient as the degree of interest.

Note that the degree of interest computation section 12 may compute a degree of interest that unifies two degrees of interest, such as a sum, product, or weighted sum of the degree of interest based on the dwell time and the degree of interest based on the scroll speed. The degree of interest computation section 12 stores the degree of interest computed for each user in the state DB 20 in association with time information indicating the time at which the access logs and operation information were acquired.

The degree of perplexity computation section 14 computes the degree of perplexity of each user toward the web site at the respective predetermined times based on the information stored in the access log DB 32 and the operation information DB 33 of the webserver 30.

For example, in some cases, a user performs a scrolling operation in a direction moving toward a predetermined place such as the top of the page being browsed, or browses while moving back and forth plural times between the same page and one or plural other pages. In such a case, it is highly likely that the user has not found a desired product or to has become confused while comparing plural products. The degree of perplexity computation section 14 accordingly holds plural items of pattern information registered in advance as patterns that are liable to arise when a user is perplexed. The degree of perplexity computation section 14 then references the access log DB 32 and the operation information DB 33, and when a pattern matching a held pattern has been detected from patterns indicated by the access logs or the operation information within a fixed amount of time in the past, the degree of perplexity computation section 14 computes a score for the pattern.

For example, the degree of perplexity computation section 14 may compute a higher score the faster the scroll speed in cases in which a pattern indicating a scroll operation in a direction moving toward the predetermined place has been detected from the operation information DB 33. Further, the degree of perplexity computation section 14 may compute a higher score the greater the number of page transitions per unit of time in cases in which a pattern of page transitions back and forth plural times between the same page and one or plural other pages has been detected from the access log DB 32.

The degree of perplexity computation section 14 computes a degree of perplexity by unifying each score as a sum, product, weighted sum, or the like of each score computed for each detected pattern. The degree of perplexity computation section 14 stores the degree of perplexity computed for each user in the state DB 20 in association with the time information indicating the time at which the access logs and operation information were acquired, namely, with the same time information as the time information associated with the degree of interest. Note that the degree of perplexity is set to a predetermined value when no patterns matching the patterns registered in advance have been detected. For example, the predetermined value may be a predetermined average value of degree of perplexity, a previously computed value of the degree of perplexity reduced by a predetermined proportion (for example, 50%), or the like.

The assistance management section 16 manages assistance being given to logged in users. Assistance being given to users is verbal remarks, advice, and the like to users from a system or an operator. Examples of types of assistance include text chat (a chat bot) or audio interaction employing an interaction system, and telephone communication with an operator (a human). The present exemplary embodiment describes a case that employs text chat employing an interaction system and telephone communication with an operator.

The assistance management section 16 makes respective inquiries to the interaction system and the operator terminal 36 and acquires the type of assistance currently being given to each user. The assistance management section 16 stores the acquired type of assistance for each user in the state DB 20 in association with the same time information as the time information associated with the degree of interest and the degree of perplexity.

Further, the assistance management section 16 acquires, from the interaction system, history of exchanges between the interaction system and the user in cases in which the assistance being given to the user is a text chat. Further, in cases in which the assistance being given to the user is telephone communication with an operator, the assistance management section 16 acquires, from the operator terminal 36, a conversation record such as a timing when a conversation was held or voice data.

Further, when the assistance management section 16 receives an instruction from the operator, via the operator terminal 36, to select a user and to change the type of assistance, the assistance management section 16 reports to the interaction system or the operator terminal 36 as needed. More specifically, when the assistance management section 16 has received an instruction to start a text chat for a given user using the interaction system, the assistance management section 16 reports the corresponding user ID to the interaction system and instructs the start of text chat. Further, when an instruction to end the text chat being executed has been received, the assistance management section 16 reports the corresponding user ID to the interaction system and instructs the end of the text chat. Note that the interaction system may be provided in the webserver 30 or may be provided as a separate device that operates in coordination with the webserver 30.

Further, when the assistance management section 16 has received an instruction to start telephone communication with an operator for a given user, the assistance management section 16 acquires, from the user information DB 31, the telephone number corresponding to the corresponding user ID and reports the acquired telephone number to the operator. Reporting the telephone number to the operator may be performed by displaying on the display section 37 of the operator terminal 36 via the display controller 18, described later. Note that the operator terminal 36 and a telephone may be linked together such that the telephone number is dialed automatically when reported to the operator terminal 36.

FIG. 5 illustrates an example of the state DB 20. In the example of FIG. 5, "time" indicating the time information, "user ID", "degree of interest", "degree of perplexity", and "assistance" indicating the type of assistance acquired by the assistance management section 16 are stored in associated with one another. Note that the "assistance" column in FIG. 5 contains "–" when assistance is not being given to the user (when the user is browsing the website without assistance). Hereafter, each record (each row) stored in state DB 20 is referred to as "state information". State information is stored in the state DB 20 so that users logged in to the website can be identified. For example, the state information of only the users who are logged in to the website may be stored, and state information of sessions matching current sessions may be stored distinctly from state information of past sessions.

The display controller 18 generates screen information regarding the screen to display on the display section 37 of the operator terminal 36 based on the state information stored in the state DB 20 and transmits the generated screen information to the operator terminal 36. Note that hereafter, for simplicity of explanation, generation of screen information regarding the screen to display on the display section 37 of the operator terminal 36 and transmission of the generated screen information to the operator terminal 36 is sometimes simply referred to as "displaying the screen" or "controlling the display section 37".

Further, the display controller 18 receives selection information transmitted from the operator terminal 36 in accordance with an input operation by the operator on the operator terminal 36. The display controller 18 controls the display section 37 so that the screen displayed on the display section 37 of the operator terminal 36 changes based on the received selection information. The screen displayed on the display section 37 is described in detail later.

Figure 6:
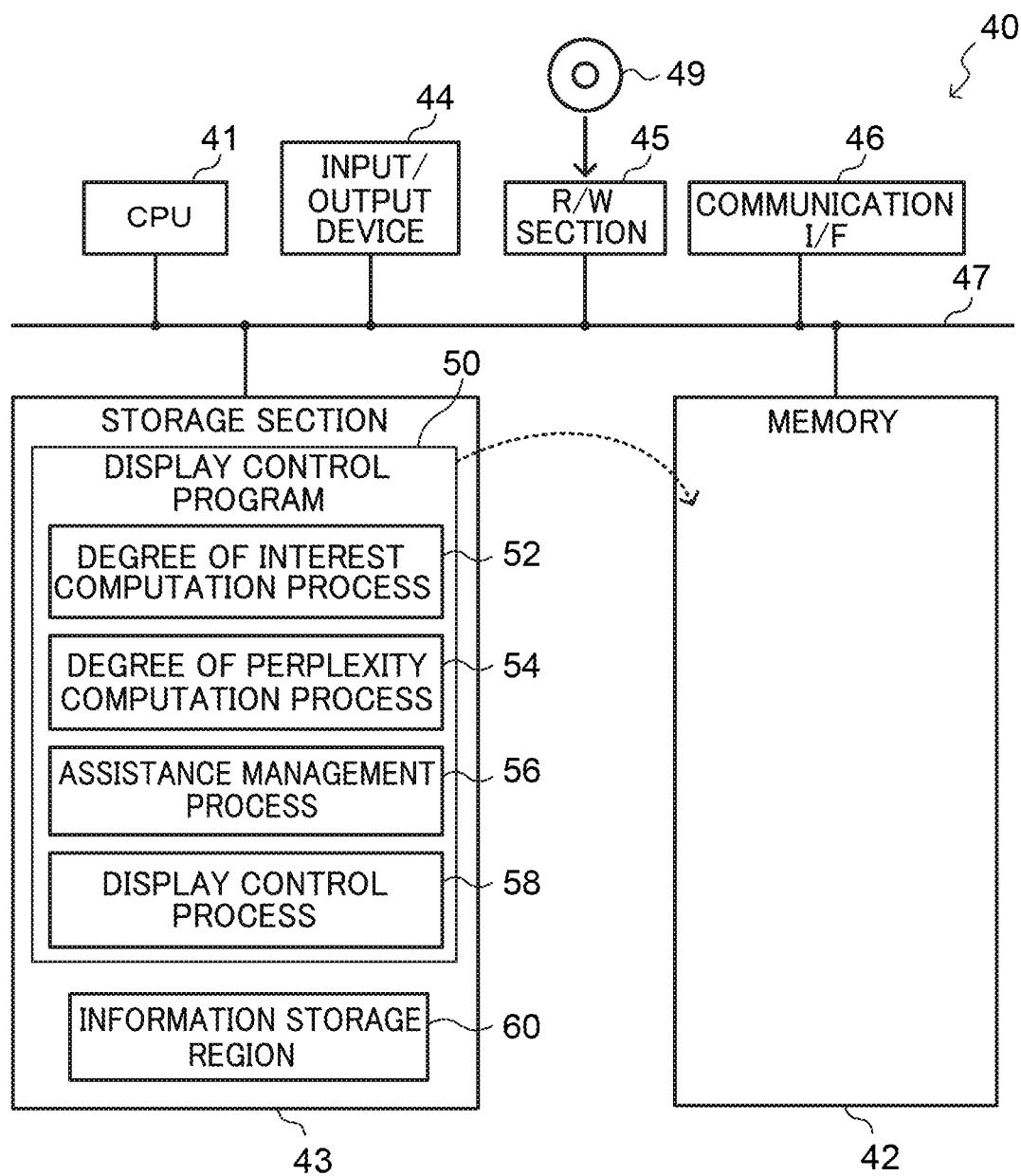
FIG. 6 is a block diagram illustrating a schematic configuration of a computer that functions as a display control device according to an exemplary embodiment.

The display control device 10 may, for example, be implemented by a computer 40 illustrated in FIG. 6. The computer 40 includes a central processing unit (CPU) 41, memory 42 serving as a temporary storage region, and a non-volatile storage section 43. Further, the computer 40 includes an input/output device 44, a read/write (R/W) section 45 that controls reading and writing of data from and to a storage medium 49, and a communication interface (I/F) 46 connected to a network such as the Internet. The CPU 41, the memory 42, the storage section 43, the input/output device 44, the R/W section 45, and the communication I/F 46 are connected to one another by a bus 47.

The storage section 43 may, for example, be implemented by a hard disk drive (HDD), a solid state drive (SSD), flash memory, or the like. A display control program 50 that causes the computer 40 to function as the display control device 10 is stored in the storage section 43, which serves as a storage medium. The display control program 50 includes a degree of interest computation process 52, a degree of perplexity computation process 54, an assistance management process 56, and a display control process 58. Further, the storage section 43 includes an information storage region 60 that stores information configuring the state DB 20.

The CPU 41 reads the display control program 50 from the storage section 43, expands the display control program 50 into the memory 42, and sequentially executes the processes included in the display control program 50. The CPU 41 operates as the degree of interest computation section 12 illustrated in FIG. 4 by executing the degree of interest computation process 52. Further, the CPU 41 operates as the degree of perplexity computation section 14 illustrated in FIG. 4 by executing the degree of perplexity computation process 54. Further, the CPU 41 operates as the assistance management section 16 illustrated in FIG. 4 by executing the assistance management process 56. Further, the CPU 41 operates as the display controller 18 illustrated in FIG. 4 by executing the display control process 58. Further, the CPU 41 reads the state information from the information storage region 60 and expands the state DB 20 into the memory 42. The computer 40, which executes the display control program 50, thereby functions as the display control device 10. Note that the CPU 41 that executes the program is hardware.

Note that the functionality implemented by the display control program 50 may be implemented by, for example, a semiconductor integrated circuit, and more specifically, by an application specific integrated circuit (ASIC) or the like.

Next, operation of the display control device 10 according to the present exemplary embodiment is described.

Figure 7:
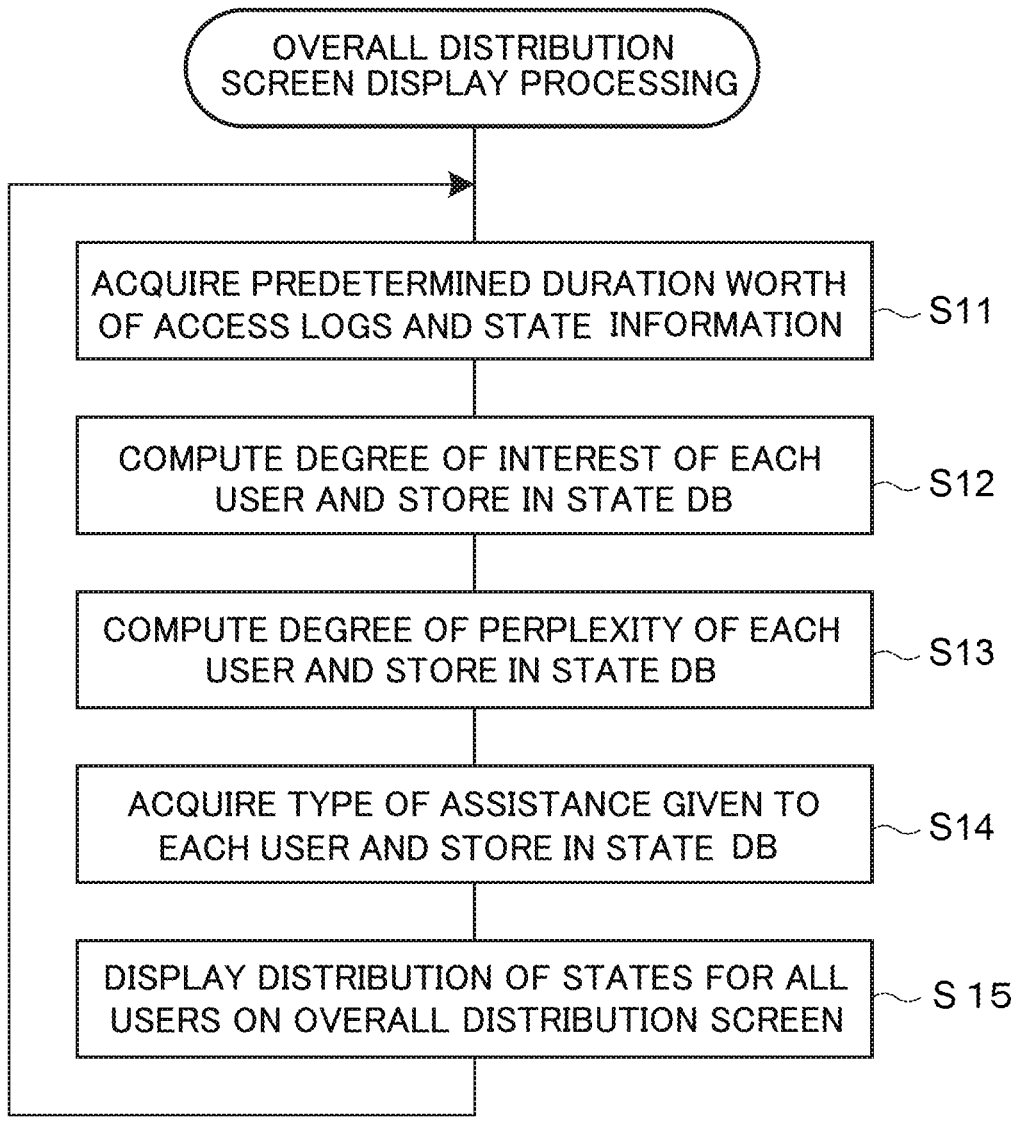
FIG. 7 is a flowchart illustrating an example of overall distribution screen display processing.
Figure 8:
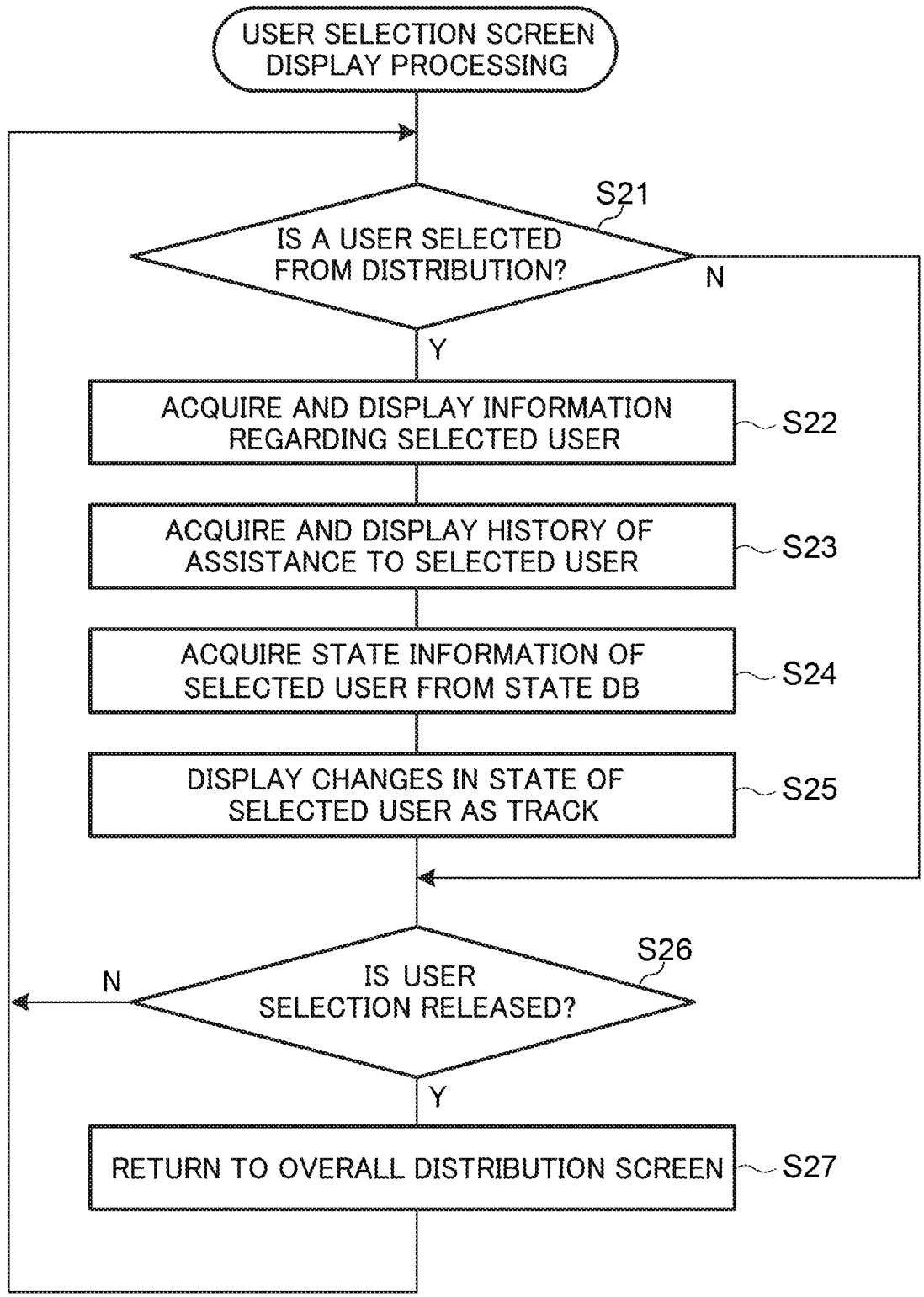
FIG. 8 is a flowchart illustrating an example of user selection screen display processing.
Figure 9:
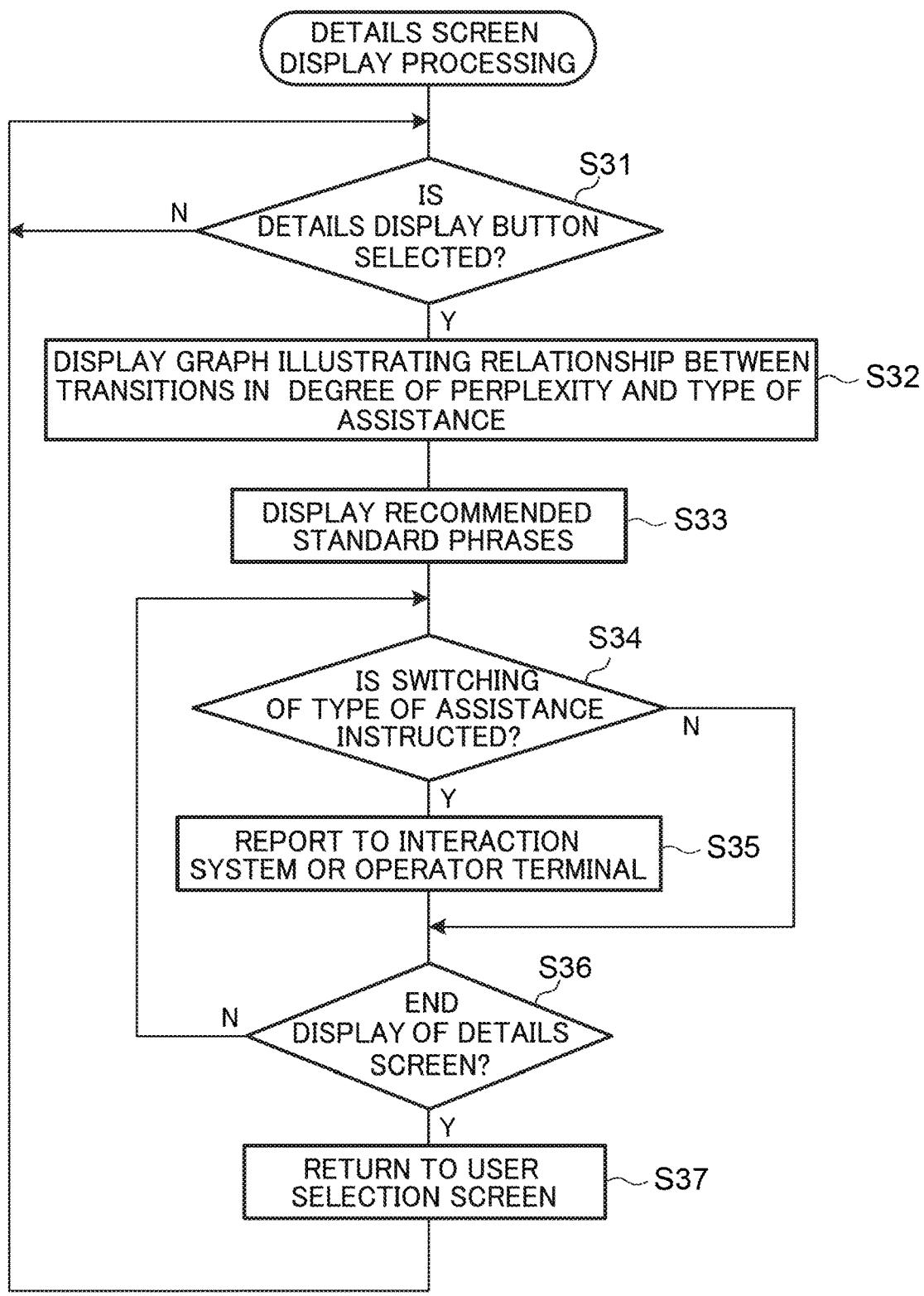
FIG. 9 is a flowchart illustrating an example of details screen display processing.

When the display control device 10 starts up, the overall distribution screen display processing illustrated in FIG. 7, the user selection screen display processing illustrated in FIG. 8, and the details screen display processing illustrated in FIG. 9 are executed in the display control device 10. Each processing is described in detail below. Note that the overall distribution screen display processing, the user selection screen display processing, and the details screen display processing are examples of display control methods of technology disclosed herein.

First, the overall distribution screen display processing illustrated in FIG. 7 is described. At step S11, the degree of interest computation section 12 acquires the latest predetermined duration worth of access logs from the access log DB 32 of the webserver 30 providing a target website. Further, the degree of interest computation section 12 acquires, from the operation information DB 33 of the webserver 30, the predetermined duration worth of operation information of the same predetermined duration as that of the acquired access logs.

Next, at step S12, the degree of interest computation section 12 computes a degree of interest of each user toward the website using the method described above based on the acquired access logs and operation information. The degree of interest computation section 12 then stores the degree of interest computed for each user in the state DB 20 in association with the time information acquired from the access logs and the operation information.

Next, at step S13, the degree of perplexity computation section 14 computes the degree of perplexity of each user toward the website using the method described above based on the access logs and operation information acquired by the degree of interest computation section 12. The degree of perplexity computation section 14 then stores the degree of perplexity computed for each user in the state DB 20 in association with the same time information as the time information associated with the degree of interest at step S12.

Next, at step S14, the assistance management section 16 makes respective inquiries to the interaction system and the operator terminal 36 and acquires the type of assistance currently being given to each user. The assistance management section 16 then stores the type of assistance acquired for each user in the state DB 20 in association with the same time information as the time information associated with the degree of interest and the degree of perplexity.

As in the state DB 20 illustrated in FIG. 5, for example, state information including "degree of interest", "degree of perplexity", and "assistance" for which the time information in the "time" column (labelled by "T1" or "T2" in the example of FIG. 5) is the same is stored in the processing of step S12 to step S14 above.

Figure 10:
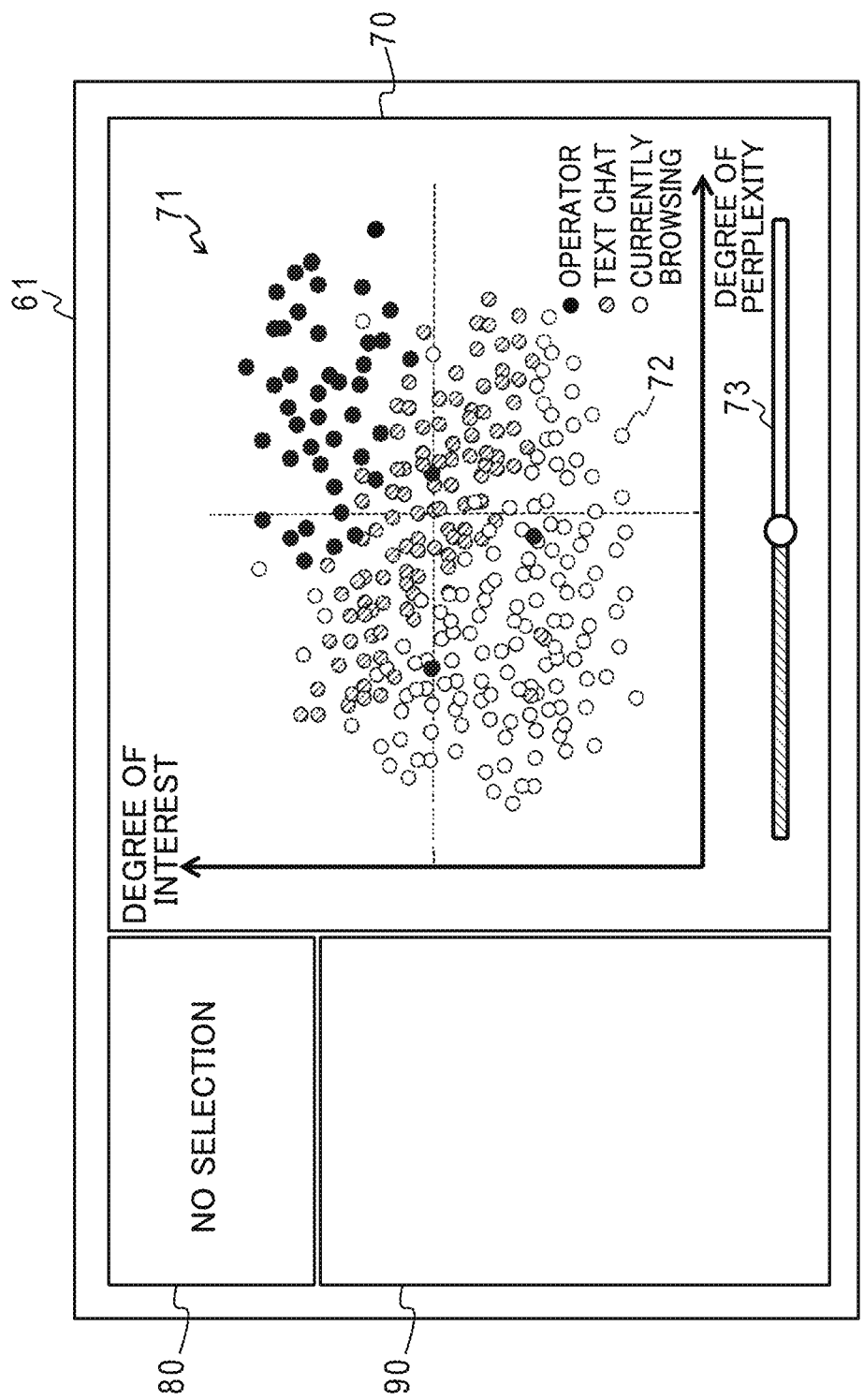
FIG. 10 is a diagram illustrating an example of an overall distribution screen.

Next, at step S15, the display controller 18, for example, displays a overall distribution screen 61 like that illustrated in FIG. 10 on the display section 37 of the operator terminal 36. In the example of FIG. 10, the overall distribution screen 61 includes a state distribution display region 70, a user information display region 80, and an assistance history display region 90. On the overall distribution screen 61, the user information display region 80 is displaying the fact that no user is selected, and nothing is displayed in the assistance history display region 90.

A region 71 in which degree of interest is indicated by the vertical axis and degree of perplexity is indicated by the horizontal axis is displayed in the state distribution display region 70 by the display controller 18. Note the example of FIG. 10 is illustrated such that degree of interest increases on progression toward the upper side of the region 71, and degree of perplexity increases on progression toward the right side of the region 71. The same applies to FIG. 11 to FIG. 13 below.

The display controller 18 then acquires state information corresponding to the latest time information for each user from the state DB 20 and displays a symbol (a round mark in the example of FIG. 10) 72 at a position in the region 71 corresponding to the degree of interest and degree of perplexity included in the state information. Further, the display controller 18 causes a display mode of the symbols to differ depending on the type of assistance included in the state information. Although the example of FIG. 10 illustrates a case in which the color of the symbol (represented by the type of hatching) is caused to differ, the type of symbol (for example, round, square, triangular, etc.), the line weight of the outline of the symbol, the size of the symbol, and the like may be caused to differ.

Accordingly, as illustrated in FIG. 10, the state corresponding to the degree of interest and degree of perplexity of each user is displayed as a distribution of all users logged in to the website. For example, assistance from the interaction system or an operator will conceivably be effective for users whose degree of interest and degree of perplexity are both high. Which users to prioritize assistance for is easily ascertainable by displaying user states as a distribution of all users.

Figure 11:
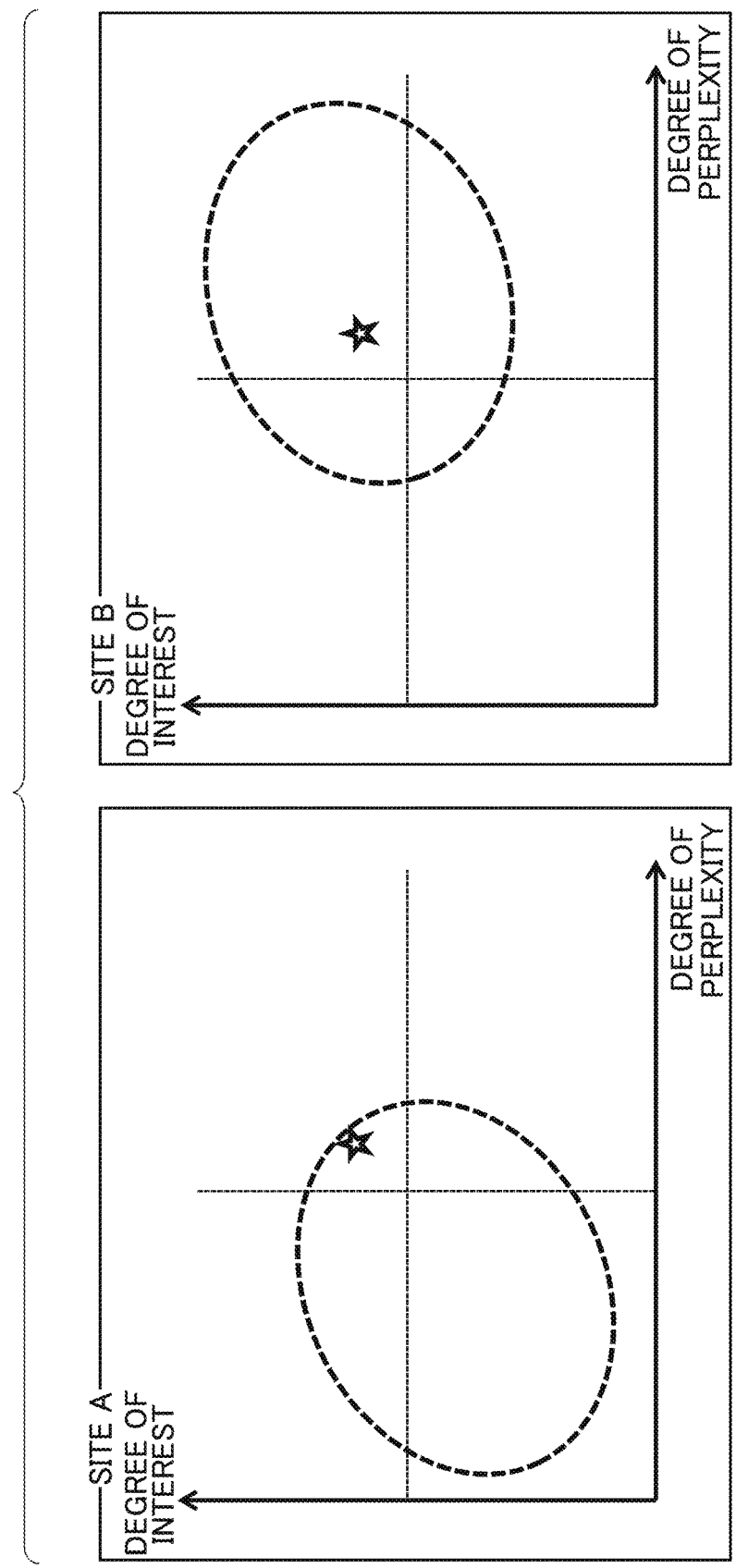
FIG. 11 is a diagram for explaining differences in state distributions between different websites.

More specifically, suppose that the state of each user logged in to a site A and the state of each user logged in to a site B are distributed in ranges indicated by ellipses in FIG. 11. In this case, even given identical values of degree of interest and degree of perplexity (for example, the positions represented by star marks in FIG. 11), it can be determined that the corresponding user of site A is to be assisted with priority, and it can be determined that assisting the corresponding user of site B is to be given less priority.

Further, since the types of assistance for each user are also ascertainable, it is also easy to determine which type of assistance to give.

Figure 12:
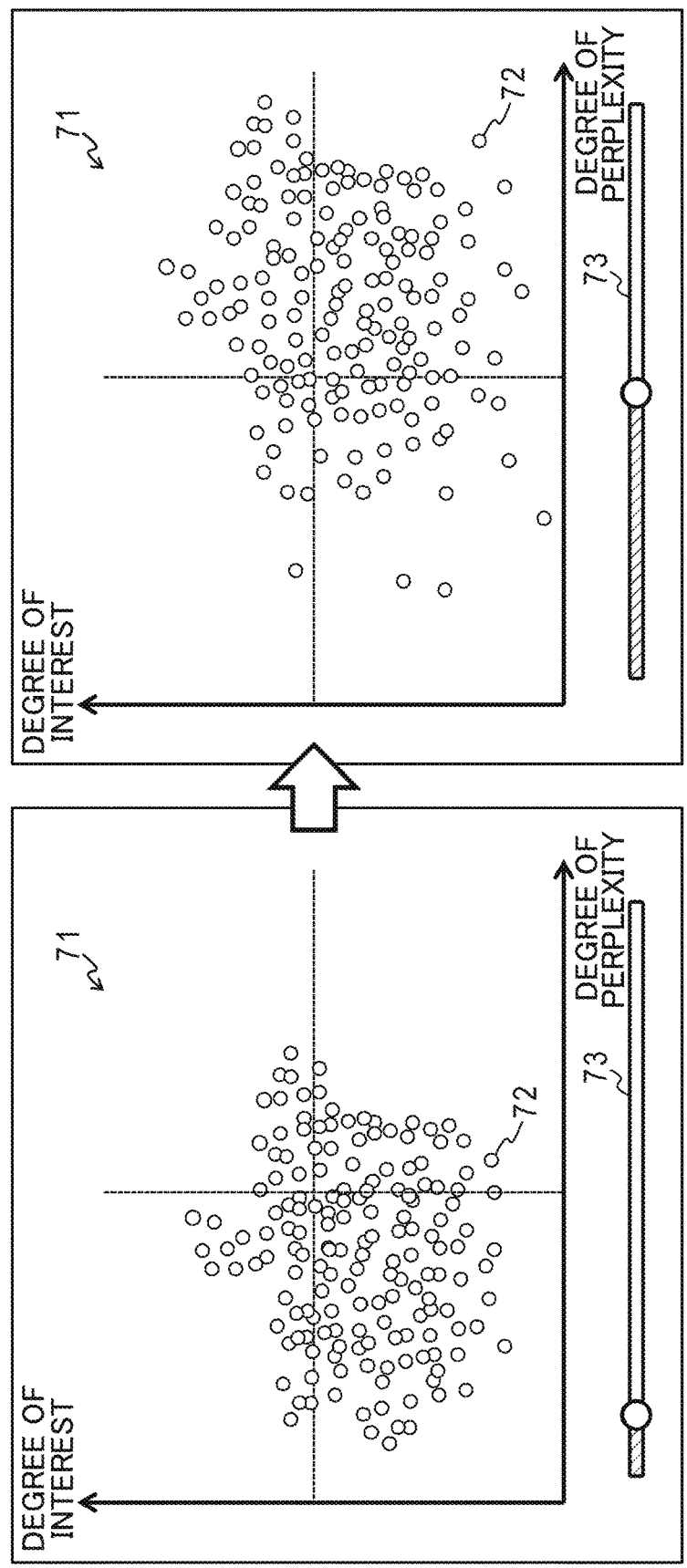
FIG. 12 is a diagram for explaining changes in state distribution with the passage of time.

Further, the display controller 18 displays a slider 73 in the state distribution display region 70 for designating time information for the distribution displayed on the region 71. When the slider 73 is slid to designate time information in the past, the display controller 18 acquires state information corresponding to that time information from the state DB 20 and displays the distribution of the states of each user in the region 71 similarly to above. This enables, for example, changes in the distribution with the passage of time to be ascertained, as illustrated in FIG. 12. For example, when a trend in which the overall distribution is changing in the direction of a higher degree of perplexity is able to be ascertained, this may be used to decide to, for example, increase the number of operators. Note that expression of different display modes for the symbols according to the type of assistance is omitted in FIG. 12.

The overall distribution screen display processing illustrated in FIG. 7 repeatedly executes at respective predetermined intervals (for example, every 30 seconds), and the distribution displayed in the region 71 is accordingly updated.

When the overall distribution screen display processing is executing, the user selection screen display processing illustrated in FIG. 8 is executed in parallel the overall distribution screen display processing.

At step S21 of the user selection screen display processing illustrated in FIG. 8, the display controller 18 determines whether or not any user is selected by determining whether or not any symbol 72 displayed in the region 71 is selected. Processing transitions to step S22 in cases in which a user is selected, or processing transitions to step S26 in cases in which no user is selected.

Figure 13:
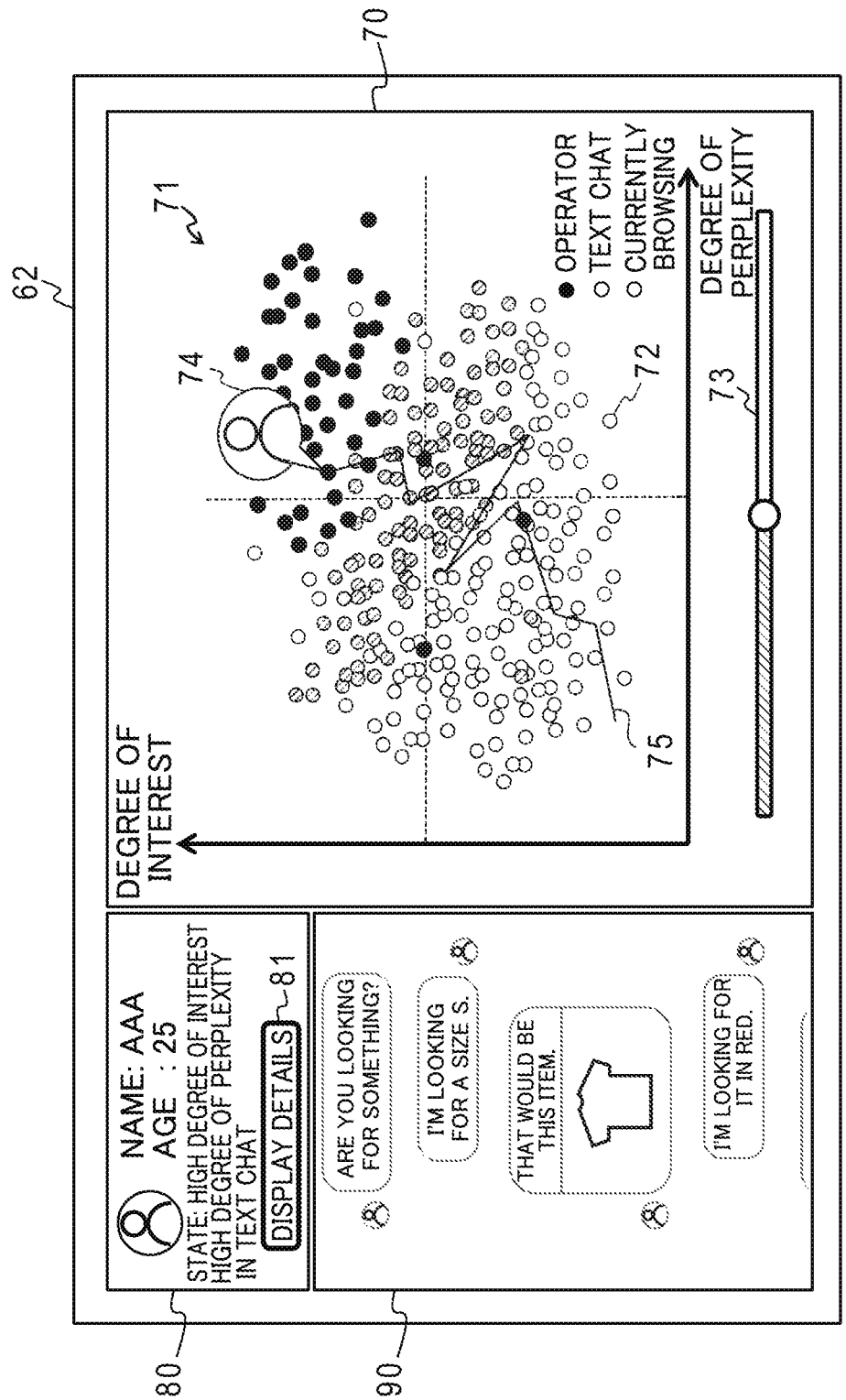
FIG. 13 is a diagram illustrating an example of a user selection screen.

At step S22, the display controller 18 acquires information regarding the user selected from the user information DB 31 of the webserver 30 using the user ID corresponding to the symbol 72 selected from the region 71 as a key. The display controller 18 switches the screen displayed on the display section 37 from the overall distribution screen 61 to, for example, a user selection screen 62 such as that illustrated in FIG. 13, and displays the acquired user information in the user information display region 80. The example of FIG. 13 illustrates an example in which the name, age, and an icon of the selected user are displayed in the user information display region 80. Further, in the example of FIG. 13, the display controller 18 displays, in the user information display region 80, whether the position of the selected symbol 72 indicates a high or low degree of interest and a high or low degree of perplexity. Furthermore, the display controller 18 displays, in the user information display region 80, a details display button 81 for instructing display of a details screen (described in detail later) related to the selected user.

Further, the display controller 18 changes display such that the symbol 72 selected from the region 71 is distinguishable from the other symbols 72. For example, as illustrated in FIG. 13, the display controller 18 displays an icon 74 of the selected user in association with the selected symbol 72. Other than displaying the icon 74, the size of the selected symbol 72 may be increased, the symbol may be caused to flash, or the symbol may be displayed with emphasis such as increased brightness.

Next, at step S23, the display controller 18 acquires history information regarding assistance given to the selected user from the interaction system or the operator terminal 36. For example, a text chat exchange is acquired from the interaction system, or information regarding a conversation record or the like is acquired from the operator terminal 36. The display controller 18 then displays the acquired information in the assistance history display region 90. When assistance to a user is currently ongoing, the display controller 18 periodically updates display of the assistance history display region 90. FIG. 13 illustrates an example in which history of a text chat is being displayed.

Next, at step S24, the display controller 18 acquires, from the state DB 20, state information of a session that is the same as the current session of the selected user, including state information from the past, using the user ID corresponding to the symbol 72 selected from the region 71 as a key.

Next, at step S25, the display controller 18 displays changes in the state of the selected user as a track 75 based on the state information acquired at step S24 above, and displays the track 75 superimposed on the distribution displayed in the region 71. More specifically, the display controller 18 plots points at positions in the region 71 corresponding to the degree of interest and degree of perplexity for each item of time information indicated by the acquired state information, and displays the track 75 by using lines to connect each plotted point in the sequence of the time information corresponding to each point.

Next, at step S26, the display controller 18 determines whether or not the user selection state is released by, for example, selecting a place other than the symbols 72 on the user selection screen 62. Processing returns to step S21 in cases in which user selection is not released, or processing transitions to step S27 in cases in which user selection is released.

At step S27, the display controller 18 switches the user selection screen 62 to the overall distribution screen 61 and processing returns to step S21.

Further, at step S22 above, when the details display button 81 is displayed, the details screen display processing illustrated in FIG. 9 is executed in parallel.

At step S31 of the details screen display processing illustrated in FIG. 9, the display controller 18 determines whether or not the details display button 81 in the user selection screen 62 is selected. Processing transitions to step S32 in cases in which the details display button 81 is selected, or the determination of the current step is repeated in cases in which the details display button 81 is not selected.

Figure 14:
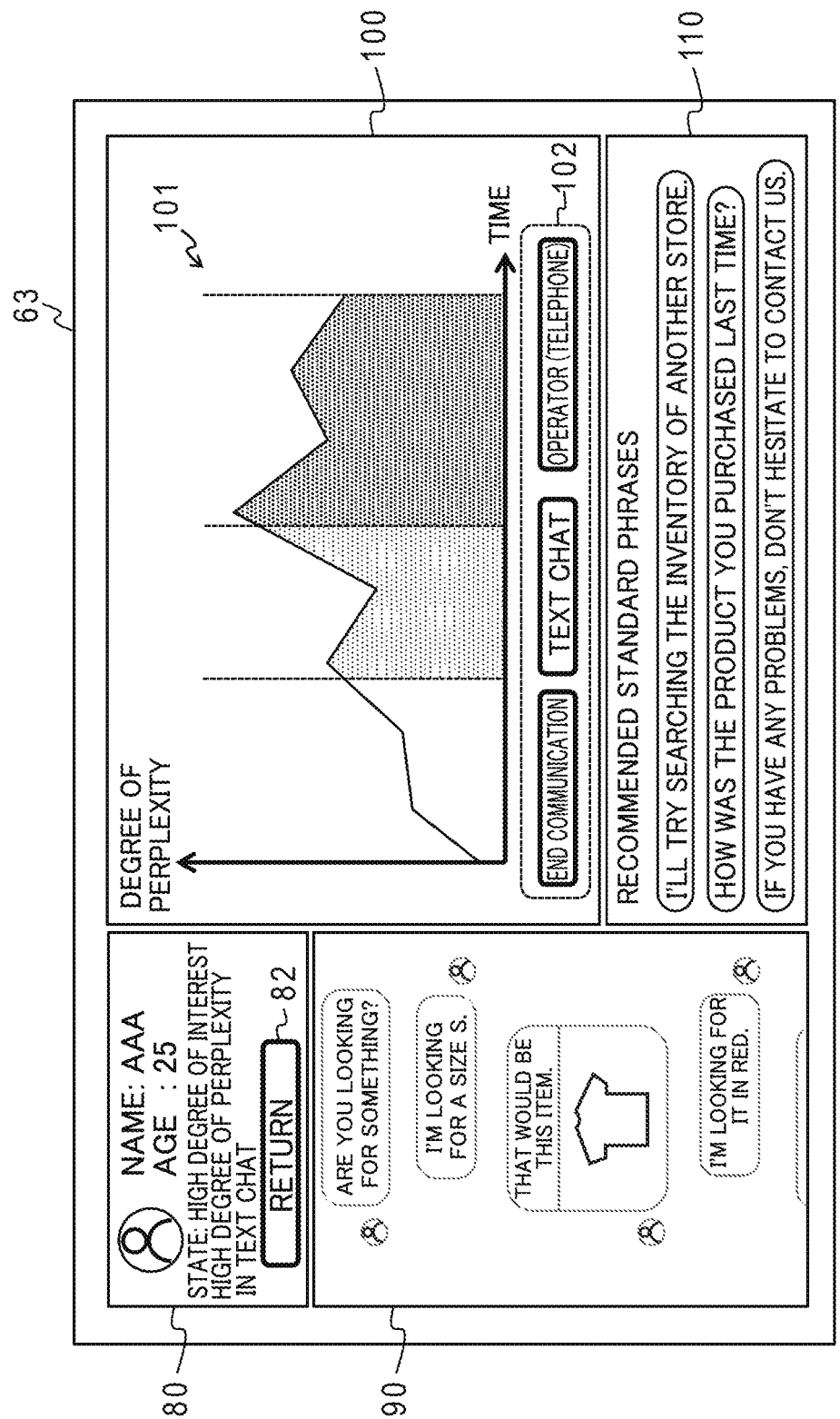
FIG. 14 is a diagram illustrating an example of a details screen.

At step S32, the display controller 18 switches the user selection screen 62 to, for example, a details screen 63 such as that illustrated in FIG. 14. In the example of FIG. 14, the details screen 63 includes a user information display region 80, an assistance history display region 90, a degree of perplexity transition display region 100, and a standard phrase display region 110. The display controller 18 displays a graph 101 illustrating degree of perplexity transitions in the degree of perplexity transition display region 100 based on the state information for the selected user acquired at step S24 above. Further, the display controller 18 also displays timings at which the type of assistance to the user was switched, in association with the graph 101. In FIG. 14, the types of assistance in respective time spans are displayed using different colors, similarly to the symbols 72, in regions bounded by the graph 101 and lines indicating times at which a type of assistance to the user was switched.

Further, the display controller 18 displays, in the degree of perplexity transition display region 100, switch buttons 102 for instructing switching of the type of assistance. FIG. 14 illustrates an example in which the switch buttons 102 include a button selected when assistance currently being executed is to be ended, a button selected when a text chat is to be started, and a button selected when telephone communication with an operator is to be started. Note that configuration may be made such that the type of assistance to switch to can be selected by a radio button, a pull-down menu, or the like, instead of the switch buttons 102. Further, the display controller 18 displays, in the user information display region 80, a return button 82 selected when returning to the user selection screen 62.

Next, at step S33, the display controller 18 displays examples of recommended standard phrases to be presented to the user in the standard phrase display region 110, based on the transitions in degree of perplexity and history of assistance of the selected user. The operator performing telephone communication refers to the displayed standard phrases. Further, standard phrases selected by the operator or the most appropriate standard phrases may be presented to the user by the text chat. Note that the standard phrases to be displayed may be determined by, for example, learning or the like in advance, and scores when learning or the like may be employed to select the most appropriate standard phrases.

Next, at step S34, the assistance management section 16 determines whether or not a switch to the type of assistance is instructed by determining whether or not a switch button 102 is selected by the operator. Processing transitions to step S35 in cases in which a switch in the type of assistance is instructed, or processing transitions to step S36 in cases in which there is no such instruction.

At step S35, the assistance management section 16 reports to the interaction system or the operator terminal 36 as needed, in accordance with the type of assistance corresponding to the selected switch button 102.

Next, at step S36, the display controller 18 determines whether or not to end display of the details screen by determining whether or not the return button 82 is selected. Processing returns to step S34 in cases in which the return button 82 is not selected, or processing transitions to step S37 in cases in which the return button 82 is selected.

At step S37, the display controller 18 switches the details screen 63 to the user selection screen 62 and processing returns to step S31.

As described above, in the display control device 10 according to the present exemplary embodiment, the degree of interest and degree of perplexity of each user toward the target website is computed and a symbol indicating each user is displayed at a corresponding position in a region having the degree of interest and degree of perplexity on two axes. This enables a user to be targeted for assistance to be easily ascertained since the state of the all users logged in to the website is displayed as a distribution.

Further, the symbol indicating each user is different for each type of assistance being given to the user, thereby enabling a user to be targeted for assistance to be easily ascertained, and this includes determinations, such as whether to start assistance or whether to switch to assistance better suited to an individual user.

Further, displaying changes to the distribution of states of all users in accordance with designated time information such that the changes can be confirmed enables problems, such as there being a strong overall trend toward degree of perplexity increasing with the passage of time or the overall degree of interest not rising even as time passes, to be ascertained. Considerations regarding operator deployment and assessments of revisions to the website can be performed based on information ascertainable from the above.

Further, in cases in which a specific user has been selected from the overall distribution, using a track to display timewise changes in the states represented by the degree of interest and the degree of perplexity of that user enables the presence or absence of sudden changes in state to be confirmed and enables future states of the user to be predicted. Accordingly, determinations, such as whether to start assistance for that specific user or whether to switch to better suited assistance for that individual user, are made easier.

Further, displaying transitions in the degree of perplexity of the user and types of assistance for the user in association with each other as details regarding the specific user enables the effectiveness of assistance up to now to be determined, and simplifies determinations, such as to switch to assistance better suited to the individual user.

Note that in the present exemplary embodiment, a case is described in which the degree of perplexity is computed in accordance with whether or not a pattern indicating perplexity is matched based on the access logs and the operation information; however, there is no limitation thereto. For example, when assistance is given to the current user by a text chat employing an interaction system, the degree of perplexity of the user is expected to increase in cases in which the transfer to interaction with the interaction system is not smooth. The degree of perplexity may accordingly be computed based on a current status of transfer in interaction compared against a predetermined status of transfer in interaction, a number of times there has been an exchange involving the same problem, or the like. Further, in interaction proceeding through predetermined stages, when, for example, reverting back to a third stage after having transferred from a first stage to a tenth stage, the degree of perplexity may be computed based on the number of stages reverted back.

Further, in the present exemplary embodiment, a case has been described in which the degree of interest is computed based on the dwell time spent on the website and the scroll speed; however, there is no limitation thereto. For example, there is a strong tendency for movement of the user terminal 38 to be suppressed, regardless of whether or not the user is performing operations on the user terminal 38, in cases in which the degree of interest toward the website is high. Accordingly, the orientation of the user terminal 38 detected by an accelerometer or the like installed in the user terminal 38 may be acquired and the degree of interest may be computed based on the size of changes to the acquired orientation of the user terminal 38.

Further, in the present exemplary embodiment, a case has been described in which switches are made in accordance with operator instructions when switching the type of assistance for the user. However, configuration may be made such that determination to switch the type of assistance is made in the display control device. For example, an instruction to start assistance for users included in a specific range in the distribution of states displayed on the overall distribution screen 61 or to switch to assistance better suited for an individual user may be output to the interaction system or the operator terminal. The type of assistance to be started or switched to may be determined in advance by, for example, learning or the like in advance, based on the current type of assistance for the user and the position of the user state in the distribution. A suitable user can be targeted for assistance in accordance with the target website by setting a user who is not a user having a degree of interest and a degree of perplexity of a predetermined threshold value or greater and who is included in a predetermined range in the distribution of states as a target for starting or switching assistance.

Further, in the present exemplary embodiment, a case has been described in which the distribution indicating states of users is displayed using a region having degree of interest and degree of perplexity as axes; however, there is no limitation thereto. For example, instead of the degree of perplexity, a degree of satisfaction of users toward the target website may be employed. In such cases, the distribution indicating the states of users is displayed using a region having degree of interest and degree of satisfaction as axes. Degree of satisfaction may, for example, be computed as "100−degree of perplexity (where degree of perplexity is in a range of from 0 to 100)". In this example, the degree of satisfaction decreases as the degree of perplexity increases.

Further, in the present exemplary embodiment, a case has been described in which the display control device is configured by a computer different from the webserver and the operator terminal; however, configuration may be made such that the display control device is configured by a single computer together with the webserver or the operator terminal.

Further, a mode has been described above in which the display control program 50, 250, 350 is pre-stored (installed) on the storage section 43; however, there is no limitation thereto. The program may be provided in a format stored to a storage medium such as a CD-ROM, DVD-ROM, or USB memory.

In conventional technology, although approach information is defined in accordance with the state of mind of the customer, the actual state of mind of a customer varies depending on the type of service, the tendencies of the customer, and the like, and these states of mind are difficult to classify in a standardized manner. Consequently, when assistance is provided to users in a standardized manner based on approach information defined for each state of mind, appropriate assistance is not provided in some cases. Further, it is desirable to be able to ascertain which user to prioritize assistance for, since, for example, assisting all of plural users using a website such as an online store is difficult.

According to an aspect of technology disclosed herein, display is performed in which an assistance target user is easily ascertainable.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory recording medium storing a display control program that causes a computer to execute a process, the process comprising:

based on information acquired from an information processing terminal that accesses content provided by an information processing device, computing a degree of interest and a degree of perplexity, with respect to the content, of a user using the information processing terminal; and based on the computed degree of interest and the computed degree of perplexity, displaying a symbol corresponding to the information processing terminal at a corresponding position in a region that has degree of interest and degree of perplexity as axes, wherein causing a display mode of the symbol to differ depending on a current type of assistance for the user.

2. The non-transitory recording medium of claim 1, the process further comprising computing the degree of perplexity based on a scrolling operation at the information processing terminal when accessing the content, or based on a state of transition of a browsing location in the content, or based on a combination thereof.

3. The non-transitory recording medium of claim 2, the process further comprising, in cases in which a scrolling operation in a direction moving toward a predetermined location in the content has been acquired as the information acquired from the information processing terminal, computing the degree of perplexity so as to be higher as the speed of the scrolling operation increases.

4. The non-transitory recording medium of claim 2, the process further comprising computing the degree of perplexity so as to be higher as a number of transitions increases within a predetermined time, between a first location in the content and one or more second locations in the content that are different from the first location.

5. The non-transitory recording medium of claim 1, the process further comprising computing the degree of interest based on at least one selected from the group consisting of:
a tilt detected by a tilt sensor installed in the information processing terminal;
a speed of a scrolling operation at the information processing terminal when accessing the content; and
a dwell time spent on the content.

6. The non-transitory recording medium of claim 5, the process further comprising causing a display mode of the symbol to differ depending on a current type of assistance for the user.

7. The non-transitory recording medium of claim 6, the process further comprising outputting an instruction to change the current type of assistance for the user in accordance with a relationship between the position at which the symbol is displayed and the display mode of the symbol.

8. The non-transitory recording medium of claim 6, wherein, in the process, the type of assistance for the user includes at least one of presenting a text message using an interaction system, presenting an audio message using an interaction system, or telephone communication with an operator.

9. The non-transitory recording medium of claim 1, the process further comprising, when selection of a symbol displayed in the region has been received, displaying, in the region, a track indicating a time-wise change in the degree of interest and the degree of perplexity of the user corresponding to the selected symbol.

10. The non-transitory recording medium of claim 1, the process further comprising, when selection of a symbol displayed in the region has been received, displaying transitions in the degree of perplexity of the user corresponding to the selected symbol in association with a type of assistance for the user.

11. The non-transitory recording medium of claim 1, the process further comprising, in cases in which a designation of a time has been received, changing a position at which a symbol is to be displayed in the region to a position corresponding to the received time.

12. A display control device, comprising:
a memory; and
a processor coupled to the memory and configured to:
compute a degree of interest and a degree of perplexity, with respect to the content, of a user using the information processing terminal based on information acquired from an information processing terminal that accesses content provided by an information processing device, and display a symbol corresponding to the information processing terminal at a corresponding position in a region that has degree of interest and degree of perplexity as axes based on the computed degree of interest and the computed degree of perplexity, wherein causing a display mode of the symbol to differ depending on a current type of assistance for the user.

13. The display control device of claim 12, wherein the processor is further configured to compute the degree of perplexity based on a scrolling operation at the information processing terminal when accessing the content, or based on a state of transition of a browsing location in the content, or based on a combination thereof.

14. The display control device of claim 12, wherein the degree of interest is computed based on at least one selected from the group consisting of:
  a tilt detected by a tilt sensor installed in the information processing terminal; a speed of a scrolling operation at the information processing terminal when accessing the content; or
  a dwell time spent on the content.

15. The display control device of claim 14, wherein the processor is further configured to cause a display mode of the symbol to differ depending on a current type of assistance for the user.

16. The display control device of claim 15, wherein the processor is further configured to cause output an instruction to change the current type of assistance for the user in accordance with a relationship between the position at which the symbol is displayed and the display mode of the symbol.

17. The display control device of claim 12, wherein the processor is further configured to, when selection of a symbol displayed in the region has been received, display, in the region, a track indicating a time-wise change in the degree of interest and the degree of perplexity of the user corresponding to the selected symbol.

18. The display control device of claim 12, wherein the processor is further configured to, when selection of a symbol displayed in the region has been received, display transitions in the degree of perplexity of the user corresponding to the selected symbol in association with a type of assistance for the user.

19. The display control device of claim 12, wherein the processor is further configured to, in cases in which a designation of a time has been received, change a position at which a symbol is to be displayed in the region to a position corresponding to the received time.

20. A display control method, comprising:
  based on information acquired from an information processing terminal that accesses content provided by an information processing device, computing a degree of interest and a degree of perplexity, with respect to the content, of a user using the information processing terminal; and
  by a processor, based on the computed degree of interest and the computed degree of perplexity, displaying a symbol corresponding to the information processing terminal at a corresponding position in a region that has degree of interest and degree of perplexity as axes, wherein causing a display mode of the symbol to differ depending on a current type of assistance for the user.

* * * * *